United States Patent

[11] 3,578,162

[72] Inventor Tage L. B. Jepsen
 Gabbs, Nev.
[21] Appl. No. 862,979
[22] Filed Oct. 1, 1969
[45] Patented May 11, 1971
[73] Assignee Basic Incorporated
 Cleveland, Ohio
 Continuation of application Ser. No.
 725,526, Apr. 30, 1960, now abandoned.

[54] BENEFICIATION OF MAGNESIAN ORES OR THE LIKE
 8 Claims, No Drawings
[52] U.S. Cl. ................................................. 209/172,
 209/211
[51] Int. Cl. .................................................... B03b 3/44
[50] Field of Search .......................................... 209/172,
 172.5, 173, 211; 233/1

[56] References Cited
 UNITED STATES PATENTS
2,150,917 3/1939 Fulke ............................. 209/172

2,385,079 9/1945 Hedley ......................... 209/172.5
2,526,519 10/1950 Vogel-Jorgensen .......... 209/173X
2,730,235 1/1956 Swimmer ...................... 209/172

Primary Examiner—Frank W. Lutter
Assistant Examiner—Robert Halper
Attorney—McGrew & Edwards ABSTRACT: Beneficiation of magnesian ores and similar derivative mixtures for concentrating or upgrading the magnesium content, usually by removal of the undesired constituents. Such mixtures after size reduction to obtain desired liberation of constituents are subjected to float and sink separations in heavy media having a gravity intermediate the float and sink constituents. Mixtures include magnesite, brucite, hydromagnesite and dolomite ores and synthetic mixtures of $CaCO_3$ and hydrated magnesium carbonates with tetrabromoethane, methylene bromide, trichloroethylene, carbon tetrachloride and methylene iodide as heavy media diluted with lighter organic liquids as necessary to establish optimum specific gravity. Movement of material in separation zone causes lighter fraction to float to surface of media while heavier fraction penetrates media and is recovered as an underflow product.

BENEFICIATION OF MAGNESIAN ORES OR THE LIKE

This application is a continuation of application Ser. No. 725,526 filed 4/30/68, now abandoned.

The present invention relates to a process for the beneficiation of ores and derivative mixtures by concentrating the magnesium content of such materials and more specifically relates to a method of concentrating such materials by gravity separation methods.

Ores are frequently separated by means utilizing differences in specific gravities of certain ore constituents. One type of treatment is designated generally as heavy media separation and the media usually is an organic liquid or a suspension of heavy substances in water having a specific gravity intermediate the float constituents and the sink constituents of the material taken for treatment. Such separations may be operated to provide a float product containing the valuable constituent and in other instances the sink product will contain the valuable constituent. Usually, the specific gravity of the media is established to insure either a clean sink product or a clean flat product, depending upon which is to contain the valuable constituent. The other product of the separation may be substantially contaminated as to any particular constituent which constitutes a major portion of same.

In order to provide an effective sink-float separation using a media such as heavy liquid, it is necessary that the ore be ground or subjected to size reduction sufficient to liberate the constituent minerals and in particular to cleanly separate the valuable constituent from other associated solids.

Various methods have been devised for the beneficiation of magnesian ores and similar derivative mixtures and in general such processes have been satisfactory for their intended purposes. Most of the magnesian ores treated commercially provide the basic ingredient required in the production of refractories and an extremely high grade composition is not required for such purpose. Accordingly, contaminant materials such as silica, lime and oxides of iron or aluminum are not objectionable so long as they are kept within prescribed limits. Sink-float separations in heavy media usually are comparatively low cost operations because of large tonnage throughput in equipment of limited size and only average power consumption in providing the necessary movements of such material. However, in order to be commercial, the heavy media must be recycled in the treatment and its established specific gravity must be kept uniform. This requires that a portion of the circulating material outside of the treatment area requires cyclic cleaning and conditioning before return to the treatment stage and if such cleaning procedures become expensive, then the overall treatment may no longer be economical.

It is an object of the present invention to provide a simple, economical and efficient sink-float process for the treatment of magnesian ores and similar derivative mixtures to obtain an upgraded or concentrated magnesium content for industrial uses having not more than an acceptable amount of contaminant matter.

Another object of the invention is to provide a group of heavy media compositions well suited for use in such sink and float separations and which may be used selectively in treatments according to determined properties and characteristics of the material under treatment.

Other objects and advantages of the present invention will become apparent in the course of the following specification.

In the practice of this invention, the separation of the material into float and sink products may be effected by a number of conventional separators, such as static cones, the "Dynawhirlpool," Dutch State Mines type cyclones, centrifuges and the like.

The materials amenable to treatment by the present process have been characterized as magnesian ores and similar derivative mixtures. In particular, mineral ores such as magnesite, brucite, hydromagnesite, nesquehonite, lansfordite, artinite, dolomite, etc. are representative of naturally occurring ores and the various impurities with which they occur consist mainly of silica, lime, iron, manganese and aluminum. I have also found that certain synthetic materials of similar composition also may be effectively treated, as, for example, synthetic mixtures of $CaCO$ and hydrated magnesium carbonates, such as $MgCO_3 \cdot 3H_2O$ and $MgCO_3 \cdot 5H_2O$. Such mixtures are produced by the carbonation of a slurry of dolomitic quick lime in which the lime would probably be hydrated. The carbonated mixtures would be similar to those which are described in British Pat. No. 610,817. For simplicity of definition, such materials are defined in the present specification as "magnesian ores and similar derivative mixtures."

The liquids in which the separation will be effected are any of the heavy organic liquids of which tetrabromoethane, methylene bromide, trichloroethylene, carbon tetrachloride and methylene iodide are the best known. They may be combined with one another, or diluted with any of the common diluents such as for instance alcohol or liquid hydrocarbons from petroleum, wood or coal tars, to establish the proper specific gravity of the solution to separate the various mineral particles. For such treatments, the specific gravity of the media in the separation zone will be maintained in the range of 2.30—3.10.

In preparing the material for treatment, it is necessary that the constituents be liberated as by grinding or other size reduction to free one constituent from adhering association with another. With certain of the materials previously identified, such liberation may involve reducing the charge to an extremely fine state and such size reduction may result in the production of some extremely fine sizes or dusts having such a minor amount of valuable constituent that the efficiency and expense of treatment is benefited by eliminating such extremely fine material before processing begins. In most treatments, the ore will be deslimed at from minus 270 to minus 325 mesh.

The ore charge after such initial preparation and after an analytical determination of the specific gravities of the valuable constituent and the intended reject material may be fed in a suitable liquid carrier vehicle into a separator containing a charge of the selected heavy media disposed within the separator to establish a sorting zone in which lower gravity constituents will be unable to penetrate and are moved to an upper discharge or float position while the constituents of higher specific gravity penetrate the sorting zone as a sink product and are conducted to an underflow discharge from the separator. Usually in such treatments, a portion of the heavy media discharges with the higher gravity product and is subsequently separated as by screening for return to the treatment while the separated solids passing from the separation stage are collected as product or are subjected to additional processing when such processing is needed.

The ores and other mixtures amenable to the treatment by the present process frequently are delivered from the mining area with a substantial water content and such water, if not removed, may impede the float and sink characteristics of ore constituents and also may act as a contaminant or diluent for the heavy media. Consequently, the practice of the present invention contemplates that the ores in at least some treatments will be dried as part of the ore preparation before separation.

In a treatment of the type described hereinabove, the preferred treatment will involve imparting a substantial movement to the material introduced into the sorting zone as by centrifugal flow, for example, to accelerate the sorting effect within the heavy media and cause the float material to rise rapidly to the surface of the liquid and at the same time assist gravity in moving the sink material through the sorting zone to a lower point of discharge.

In order to perform the treatment efficiently in continuous operation, media replacement in sorting zone will be required. In preferred practice, a substantially equivalent amount is introduced into the sorting zone to replace the portion passing with the sink product discharge. After the sink product and associated media passes from the separation stage, the media will be separated from the sink product solids as by screening or other suitable method of separation following which the separated media is subjected to cleaning as required and establishment of the desired specific gravity therein before it is returned to the treatment as replacement media. In this connection, the media may be any one of the compositions previously enumerated or combinations of two or more such compositions and the single or mixed compositions may be diluted with common diluents, such as alcohol or liquid hydrocarbons of the type previously described so as to maintain the established specific gravity for the sorting zone.

As indicated in the preceding remarks, the practice of the present invention is applicable to a variety of naturally occurring ores and similar synthetic compositions. The heavy media separation as described herein will upgrade or produce a concentrate of a valuable constituent which usually is of satisfactory grade for its intended use as a commercial product. In other instances, the upgraded or concentrate material comprises the feed to another treatment from which the final product is evolved. In order to better illustrate novel features of the practice, certain typical tests are cited. In the first of these, a magnesite ore designated While Haven magnesite was subjected to three test separations in heavy media of slightly varying density. The test demonstrated that a good recovery could be obtained with a sink product of low $SiO_2$ and CaO composition as shown in the following tabulation:

| Density | Float | | | Sink | | |
|---|---|---|---|---|---|---|
| | Percent weight | Percent $SiO_2$ | Percent CaO | Percent weight | Percent $SiO_2$ | Percent CaO |
| 2.85 | 9.5 | 6.88 | 21.00 | 90.5 | 1.83 | 2.52 |
| 2.90 | 10.2 | 3.80 | 20.60 | 89.8 | 1.82 | 2.30 |
| 2.95 | 10.0 | 2.80 | 19.00 | 90.0 | 1.56 | 1.95 |

In another test, a brucitic ore was subjected to treatment in a sorting zone containing acetylene tetrabromide as the heavy media liquid. A highly satisfactory recovery was obtained with a sink product of good grade as shown in the following tabulation:

| | Percent recovery | Percent $SiO_2$ | Percent $R_2O_3$ | Percent CaO | Percent MgO |
|---|---|---|---|---|---|
| Heads | 100.00 | 0.93 | 0.90 | 2.10 | 96.07 |
| Float | 1.78 | 5.72 | 0.94 | 30.50 | 61.84 |
| Sink | 98.22 | 0.90 | 0.83 | 1.58 | 96.69 |

In another treatment, an attempt was made to obtain a high grade brucite from a very low grade brucitic ore from Wakefield, Quebec. The heavy media separation treatment of the present invention was found to provide a satisfactory degree of concentration. In the test conducted, the ore was ground to minus 100 plus 325 mesh and the preferred specific gravity for the media of 241 was first tested. This media comprised a mixture of methylene bromide and trichloroethylene. Additional separations were undertaken in liquids of 2.68 and 2.96 specific gravity. The results of this testing are shown in the following tabulation:

| | Percent weight | Percent loss | Percent $SiO_2$ | Percent $Fe_2O_3$ | Percent $Al_2O_3$ | Percent CaO | Percent MgO |
|---|---|---|---|---|---|---|---|
| Heads | 100.00 | 38.20 | 7.28 | 0.94 | 0.89 | 60.03 | 30.86 |
| 2.41 Float | 11.7 | 31.70 | 1.77 | 1.23 | 1.80 | 0.76 | 94.44 |
| 2.68 Float | 47.0 | 36.28 | 12.45 | 0.60 | 1.10 | 53.20 | 32.65 |
| 2.96 Float | 39.6 | 43.98 | 0.61 | 0.20 | 0.27 | 93.00 | 5.72 |
| 2.96 Sink | 1.7 | 15.73 | 25.45 | 10.24 | 11.20 | 5.34 | 47.77 |

Another test was undertaken with a sample of freshly mined hydromagnesite. This ore was ground to pass 65 mesh and deslimed at 325 mesh. It was treated in a heavy liquid maintained at 2.30 specific gravity. The results were as follows:

| | Percent weight | Percent loss | Percent $SiO_2$ | Percent $Fe_2O_3$ | Percent $Al_2O_3$ | Percent CaO | Percent MgO |
|---|---|---|---|---|---|---|---|
| Heads | 100.00 | 55.90 | 0.66 | 0.59 | 0.45 | 4.08 | 94.22 |
| Sink | 6.80 | 45.26 | 4.97 | 0.29 | 1.50 | 50.79 | 42.45 |
| Float | 93.20 | 57.01 | 0.23 | 0.65 | 0.33 | 0.70 | 98.09 |

The foregoing tests are cited merely as examples of representative treatments that may be performed in the practice of the present invention. The first test results reported on page 8 involved a raw ore or ignition-free determination and all the other tests reported on pages 8 and 9 involved determinations made on a calcined ore basis. Some of such tests were undertaken more for the purpose of obtaining information than in seeking to attain maximum efficiency. However, it will be clear from examination of reported tests that a variety of magnesian ores and similar derivative mixtures may be treated by the practices described herein and will be effective in upgrading or concentrating a desired constituent of such materials.

I claim:

1. The process of treating low grade brucitic ores to obtain a high grade brucite concentrate, which comprises introducing a charge of such material in finely divided condition into a centrifugal sorting zone in which an organic heavy media liquid of at least one substantially nonpolar compound having a specific gravity in the range of 2.38—2.50 is subjected to the centrifugal sorting treatment, said liquid media selected for treatment having a specific gravity substantially different than that of the magnesian content of the charge, continuing the treatment of the charge in the presence of the nonpolar media until said magnesian content is segregated and removed from the treatment zone as an upgraded float fraction of the separation, separating the selected media from contained solids constituents of at least one fraction of the ore so separated for continuous recycle to the separation zone so as to maintain the specific gravity in said zone substantially uniform throughout a period of continuous treatment, and discharging the upgraded magnesian float fraction as a high grade brucite concentrate of the treatment.

2. A process as defined in claim 1, in which the nonpolar compound has a specific gravity of about 2.41.

3. A process as defined in claim 1, in which the nonpolar compound is methylene bromide.

4. A process as defined in claim 1, in which the nonpolar compound is a mixture of methylene bromide and trichloroethylene.

5. A process as defined in claim 1, in which the ore charge is in the size range of −100 +325 mesh.

6. A process as defined in claim 1, in which the selected media is separated from the sink fraction of the separation.

7. A process as defined in claim 1, in which the material in the treatment zone is subjected to continuous centrifugal movement until discharge from said zone.

8. The process of treating low grade brucitic ores to obtain a high grade brucite concentrate, which comprises introducing a charge of such material in finely divided condition into a centrifugal sorting zone in which an organic heavy media liquid of at least one substantially nonpolar compound having a specific gravity in the range of 2.38—2.50 is subjected to the centrifugal sorting treatment, said liquid media selected for treatment having a specific gravity substantially greater than that of the magnesian content of the charge including the brucite content thereof, continuing the treatment of the charge in the presence of the nonpolar media until said magnesian content is segregated and removed from the treatment zone as an upgraded float fraction of the separation, separating the selected media from contained solids constituents of at least one fraction of the ore so separated for continuous recycle to the separation zone so as to maintain the specific gravity in said zone substantially uniform throughout a period of continuous treatment, and discharging the upgraded magnesian fraction as a high grade brucite concentrate of the treatment.